United States Patent Office.

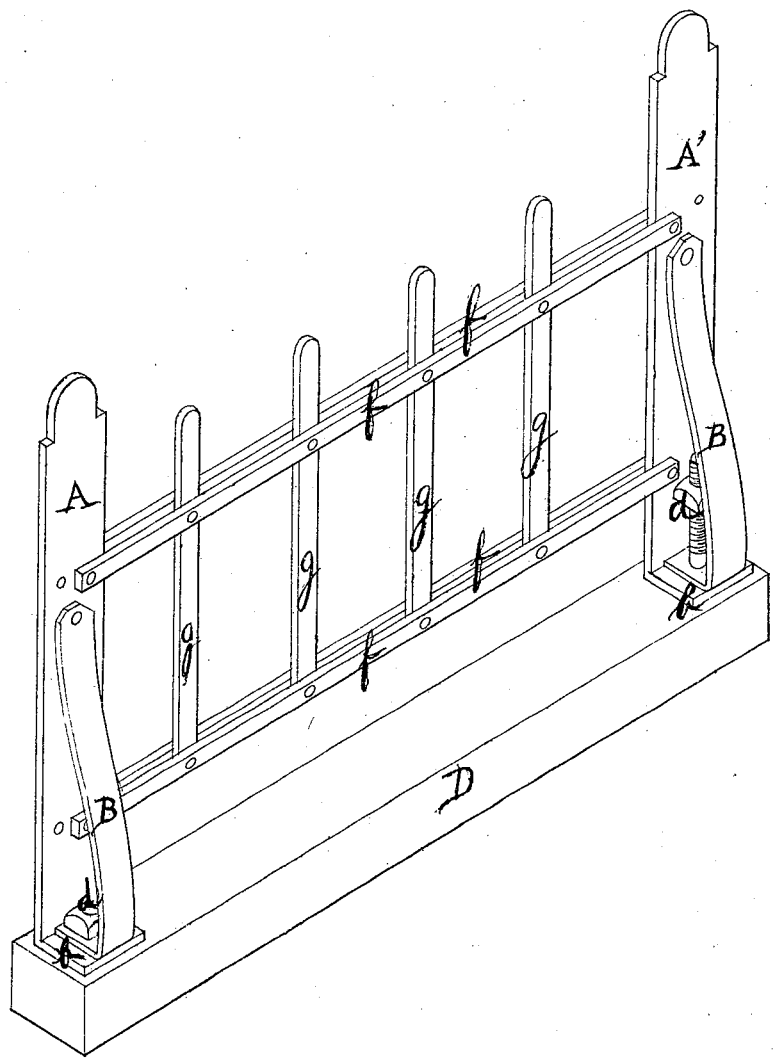

JOSEPH G. DOWNER, OF AUBURN, NEW YORK.

Letters Patent No. 96,561, dated November 9, 1869.

IMPROVEMENT IN FENCE.

The Schedule referred to in these Letters Patent and making part of the same.

*To all whom it may concern:*

Be it known that I, JOSEPH G. DOWNER, of Auburn, in the county of Cayuga, and State of New York, have invented certain new and useful Improvements in Fences; and I do hereby declare that the following is a full, clear, and exact description thereof, reference being had to the accompanying drawings, and to the letters of reference marked thereon, which form a part of this specification, and in which is represented a perspective of my invention, the nature of which consists in pivoting the horizontal bars to the vertical slats and posts, and using the fence or panel thereof, in combination with an upright screw-bolt, provided with a nut, substantially as hereinafter set forth.

To enable others skilled in the art to make and use my invention, I will now describe its construction and operation.

D represents the ground-sill, up through one end of which extends the screw-bolt $d$.

A A' represent the end-posts or pieces, which are of metal, their lower ends being turned at right angles, as seen in the drawing, the object of which will be fully set forth presently.

$f f$ are horizontal bars, pivoted opposite to each other, to the sides of the posts A A'.

$g g$ represent vertical slats, pivoted between both the top and bottom bars $f f$.

B B are metal braces, their lower ends turned inward at right angles, and resting upon the bases of the end-pieces A A', and their upper ends bolted also to the same pieces, as fully shown in the drawings.

A suitable hole is provided in the bases $b b$ of the end-pieces A A, and also in braces B B, for them to be confined to the sill D, by means of screw-bolts and nuts.

As already stated, the screw-bolt $d$ extends up some distance beyond the sill, so as to admit of that end of the panel being elevated or depressed, to accommodate the fence to any declivity of the surface of the ground.

$c'$ is a nut upon screw-bolt $d$, to regulate the height or angle to which the panel may be adjusted.

My fence is designed more especially for cemetery-purposes, where it will be found to possess features peculiarly desirable.

Having thus fully described my invention,

What I claim, and desire to secure by Letters Patent, is—

The elongated screw-bolt $d$, in combination with a fence or panel thereof, constructed substantially as described, and operating as and for the purpose specified.

In testimony that I claim the foregoing as my own, I affix my signature, in presence of two witnesses.

J. G. DOWNER.

Witnesses:
   HORACE T. COOK,
   A. S. WORTH.